United States Patent
Brong et al.

(10) Patent No.: US 8,873,192 B1
(45) Date of Patent: Oct. 28, 2014

(54) MAGNETIC TAPE HEADS

(71) Applicants: Hewlett-Packard Development Company, L.P., Houston, TX (US); Quantum Corporation, San Jose, CA (US)

(72) Inventors: Brian Brong, Boise, ID (US); Richard Dee, Boulder, CO (US); Geoff Spratt, Boise, ID (US); Mike Alan Holmberg, Eagle, ID (US); Robert Brummet, Louisville, CO (US)

(73) Assignees: Hewlett-Packard Development Company, L.P., Houston, TX (US); Quantum Corporation, San Jose, CA (US)

( * ) Notice: Subject to any disclaimer, the term of this patent is extended or adjusted under 35 U.S.C. 154(b) by 0 days.

(21) Appl. No.: 13/954,209

(22) Filed: Jul. 30, 2013

(51) Int. Cl.
  *G11B 21/02* (2006.01)
  *G11B 5/33* (2006.01)
(52) U.S. Cl.
  CPC .................................... *G11B 5/33* (2013.01)
  USPC .......... 360/75; 360/78.02; 360/83; 360/77.12

(58) Field of Classification Search
  None
  See application file for complete search history.

(56) References Cited

U.S. PATENT DOCUMENTS

| | | |
|---|---|---|
| 5,757,591 A | 5/1998 | Carr et al. |
| 5,903,415 A | 5/1999 | Gill |
| 5,963,415 A | 10/1999 | Johansen |
| 6,400,534 B1 | 6/2002 | Klaassen |
| 7,135,203 B2 | 11/2006 | Scheibner et al. |
| 7,142,398 B2 | 11/2006 | Granstrom et al. |
| 8,130,473 B2 * | 3/2012 | Hachisuka ..................... 360/316 |
| 8,169,751 B2 | 5/2012 | Albrecht et al. |
| 2006/0198057 A1 * | 9/2006 | Leung et al. .................. 360/323 |
| 2012/0092022 A1 * | 4/2012 | Iben .............................. 324/537 |

OTHER PUBLICATIONS

Iben, I.E.T. et al., Tribocharging of Materials Used in Tape Heads and Associated ESD Damage, (Research Paper), Sep. 8-16, 2005, pp. 1-10, https://www2.lirmm.fr/lirmm/interne/BIBLI/CDROM/MIC/2005/EOSESD_2005/pdffiles/papers/4A.7.

* cited by examiner

*Primary Examiner* — Muhammad N Edun

(57) ABSTRACT

Techniques for operating tape heads are provided. In an example, a method includes detecting a potential at a sensor region, determining a target potential using a transfer function, and applying the target potential to an effector region.

20 Claims, 8 Drawing Sheets

100

400

600

800

MAGNETIC TAPE HEADS

BACKGROUND

Magnetic tape drives provide a tool for storing large amounts of data, for example, for performing backups. However, the motion of the magnetic tape across the tape bearing surfaces can cause tribocharging to occur. As used herein, tribocharging refers to the electrification of materials during frictional contact, e.g., the buildup of a static charge. The tribocharging can lead to an electrostatic discharge (ESD), which may damage the read/write elements in the head.

Further, the tribocharging may cause current flows in various parts of the head. These currents may contribute to the electrochemical removal and deposition of material from the read/write elements and magnetic tape. The removal of material from the read/write elements and the surrounding dielectric is commonly referred to as pole tip recession (PTR). Over time, PTR spaces the active elements away from the magnetic tape, leading to reduced performance and head failure.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
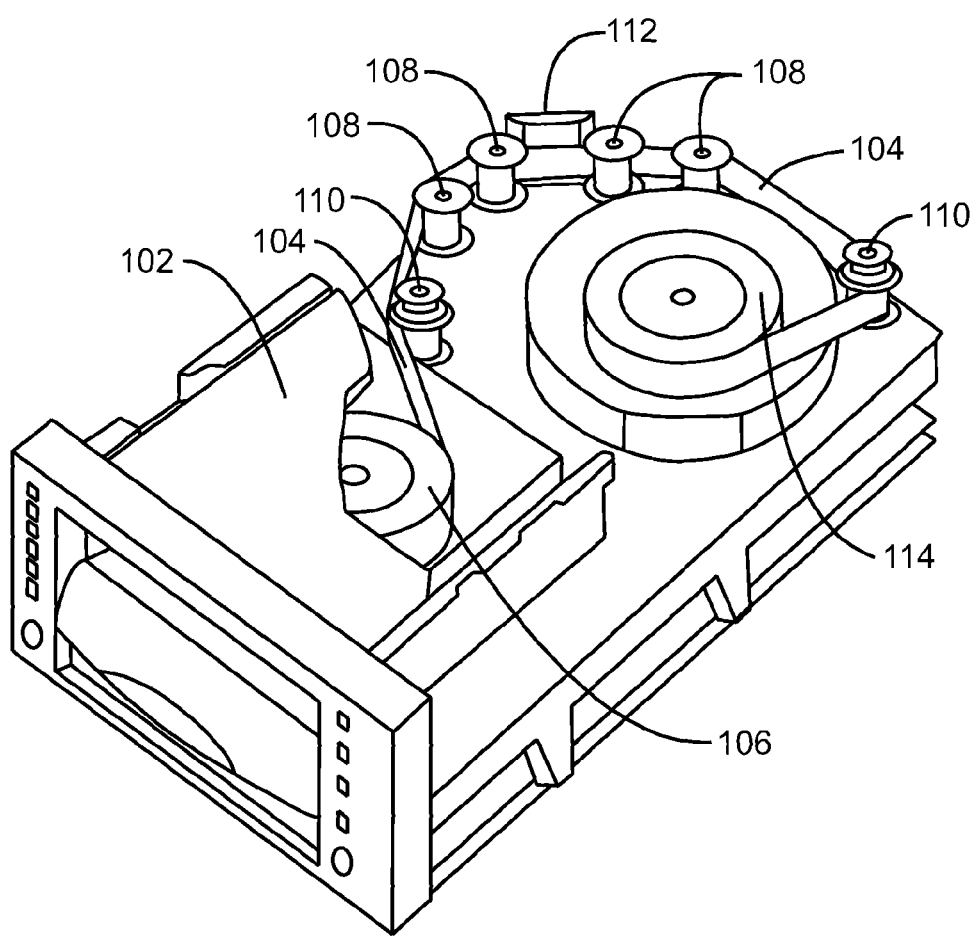
FIG. 1 is a drawing of a tape drive mechanism with a tape cartridge inserted.

Although the term "potential" is associated with voltage, as used herein, the term potential also encompasses measured and applied currents. Thus, any use of potential can be replaced with voltage and/or current. Further, any circuits shown with a resistor to ground at an output or input point, for current to voltage conversion, may be used without the resistor in a current mode.

The techniques described herein can be used to mitigate tribocharging and compensate for variability in tribocharging. The techniques actively sense a potential downstream from the tribocharging and counteracting the tribocharging by injecting or removing current from the magnetic tape. This decreases the current flow into or out of the active elements and, therefore, decreases the pole tip erosion associated with electrochemical reactions driven by these currents. In an example, a potential is applied upstream of the active elements and a potential is sensed downstream of the active elements, after the magnetic tape has interacted with the tape bearing surface and other contact regions where tribocharging can occur. This helps minimize the current flow at the active elements and the dielectric separating them. These techniques may be used on any device where two surfaces pass by each other and induce current flow due to tribocharging.

Tribocharging is a complex phenomenon that is influenced by a number of variables. These variables include, for example, the materials used in the magnetic tape and the physical characteristics of the magnetic tape, such as conductivity, surface roughness, and coefficient of friction, among others. Further, wear of the magnetic tape and read/write heads can affect properties such as the real area of contact, the interfacial lubrication between the materials, and the chemical composition of the interfacial region of the materials. A magnetic tape drive may be run at different speeds during drive operation, causing variation in the amount of tribocharging. The tension on a tape can also vary between units and during different points during operation. Wear and deposition of materials onto the head can affect the tape head interface and change the amount of tribocharging. The tribocharging of the tape can be related to the tape wind position. The variability from the beginning of tape (BOT) to the end of tape (EOT) can be in the 10s of volts. Fixed biases may not account for such large variability. Other discharge paths that are specific to the mechanical and material design can influence the buildup of potentials, such as the conduction path through rollers. Environmental conditions can influence the potentials as well. For example, humid environments can dissipate potentials.

Passive systems may be used for mitigation of tribocharging. For example, resistor networks can be used to control the potentials. However, the resistor networks may not eliminate a current flow that can cause PTR of the active region, as conditions can cause variations in the amount of tribocharging. Another system uses fixed potential biasing on the read/write elements to counteract the potential on the tape and mitigate current flows. However, the fixed biases may not vary in response to the potential, and may apply unnecessary potentials to the tape. In addition, the biases are applied to the active elements and are limited by other design constraints. Generally, the passive solutions may be insufficient as they do not take into the variable conditions that can change the amount of tribocharging.

FIG. 1 is a drawing of a tape drive mechanism 100 with a tape cartridge 102 inserted. The tape cartridge 102 supplies the magnetic tape 104, which is stored on a supply reel 106. Upon insertion into the tape drive mechanism 100 the magnetic tape 104 is automatically threaded around a number of tape guides 108 and drive rollers 110, and across a read/write head 112, to be collected on a take-up reel 114.

Any number of the units depicted can contribute to tribocharging of the read/write head 112. For example, pulling the magnetic tape 104 from the supply reel 106 in the tape cartridge 102 can cause tribocharging as layers of the magnetic tape 104 are pulled away from other layers. A similar effect can occur as the magnetic tape 104 is removed from the take-up reel 114 and returned to the supply reel 106.

However, a substantial source of tribocharging may be the read/write head 112 itself. Most other units, such as the tape guides 108 and drive rollers 110, often rotate with the magnetic tape 104 as it passes over them. In contrast, the magnetic tapes 104 slides across the read/write head 112, which can cause tribocharging. In examples described herein, the tribocharging may be mitigated by an active system that is coupled to the read/write head 112. In the active system, the potential on the magnetic tape 104 is measured after the magnetic tape 104 has passed over the read/write elements in the read/write head 112. A compensating potential is applied to the magnetic tape 104 before the magnetic tape 104 passes over the read/write elements in the read/write head 112. The compensating potential may be adjusted to neutralize the potential at the measurement point or to achieve a set point potential at the measurement point.

The tape drive mechanism 100 does not have to have the configuration shown in FIG. 1. In some examples, the tape drive mechanism 100 may have a tape cartridge 102 that includes both the supply reel 102 and take-up reel 114. In other embodiments, the magnetic tape 104 may be supplied from an open supply reel 102 to an open take-up reel 114, without an enclosing cartridge. In all of these examples, the mitigation circuitry may be useful for reducing or eliminating tribocharging.

Figure 2:
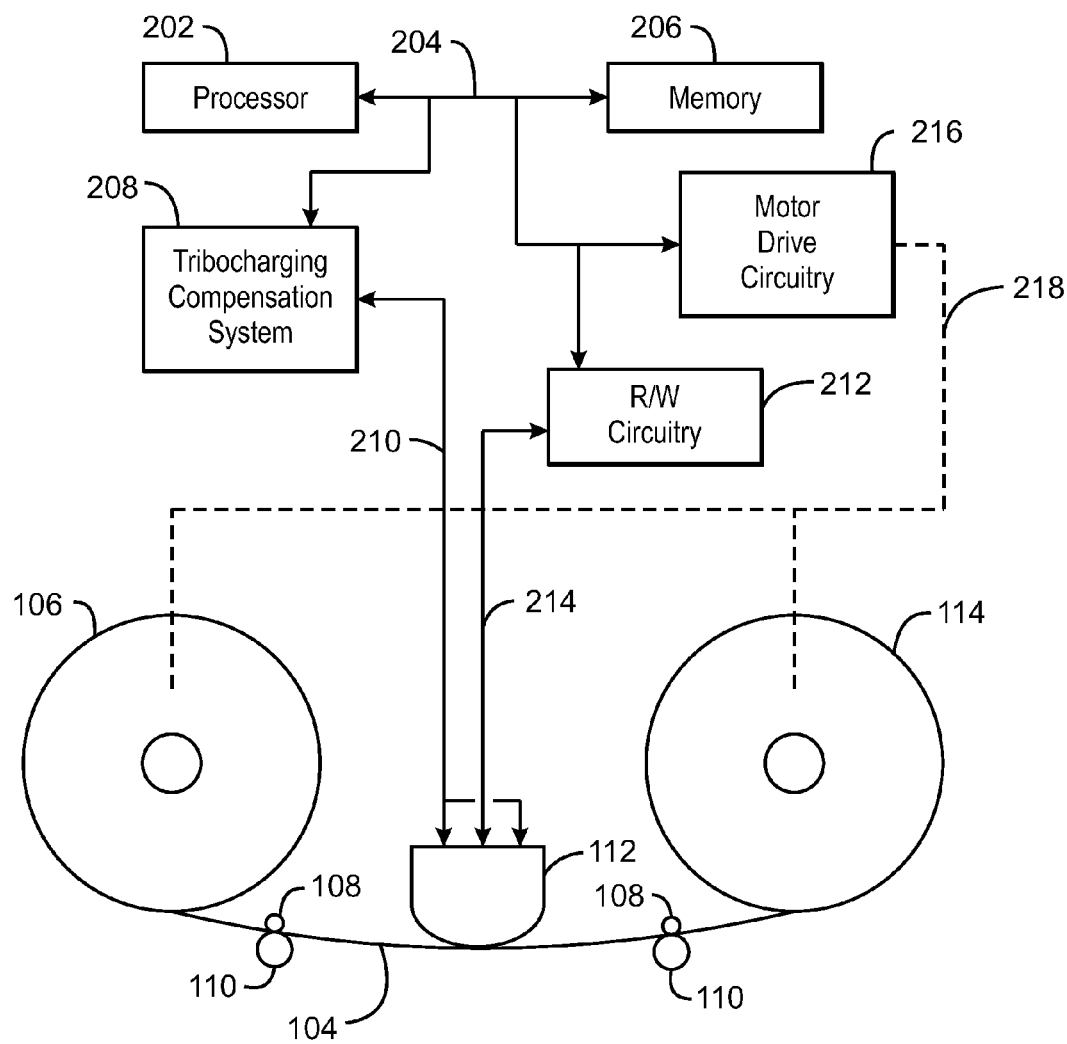
FIG. 2 is a schematic view of a tape drive system.

FIG. 2 is a schematic view of a tape drive system 200. Like numbered items are as discussed with respect to FIG. 1. The schematic view illustrates circuit and software blocks that can be used to mitigate tribocharging in a tape head 112. The tape drive system 200 may have a processor 202 that is coupled to a number of other units over a bus 204. The processor 202 may be a microprocessor, a multicore processor, or any number of other units. The bus 204 can be an ISA bus, an EISA bus, a microcontroller bus, a PCI bus, a PCIe bus, or any number of other types of buses. For example, if the tape drive system 200 is part of a network backup system in a larger implementation, multiple tape drives may be controlled as part of a single tape drive system 200, for example, using a multicore processor and a PCIe bus. In a tape drive system 200 that uses a single tape drive, a single core microprocessor using a microcontroller bus may be sufficient.

A memory 206 may be coupled to the bus 204 to hold instructions for the processor 202. In an example, the memory 206 holds instructions that direct the processor 202 to access a tribocharging compensation system 208 over the bus 204. The tribocharging compensation system 208 is coupled to a sensor region and an effector region in a read/write head 112 by mitigation lines 210. The tribocharging compensation system 208 may use an analog-to-digital convertor (ADC) to measure the potential on the read/write head 112 and a digital-to-analog convertor (DAC) to apply a potential to the read/write head 112. The tribocharging compensation system 208 is not limited to a digital system, but may be an analog system, for example, as discussed with respect to FIG. 7.

The instructions can also direct the processor 202 to access a read/write circuit 212, which is coupled to read/write elements in the read/write head 112 through R/W Lines 214. The instructions can also direct the processor 202 to access a motor drive 216 over the bus 204. The motor drive 216 is coupled through motor power lines 218 to motors that move the magnetic tape 104 between the reels 106 and 114.

During operation, the instructions in the memory 206 can direct the processor 202 to use the tribocharging compensation system 208 to measure a potential on a magnetic tape 104, for example, using a sensor region in a read/write head 112. The instructions may then direct the processor 202 to calculate a target potential to be applied to the read/write head 112 using a transfer function, e.g., to cancel a portion of the measured potential, decreasing current flows between the magnetic tape 104 and the read/write head. The processor 202 can then access the tribocharging compensation system 208 to apply the potential to the magnetic tape 104, using an effector region on the read/write head 112.

The schematic view of FIG. 2 is not intended to indicate that the tape drive system 200 may only be configured as shown. For example, the sensor and effector may be located in structures outside of the tape head 112. In one example, the tape guides 108 may be coupled to the tribocharging compensation system 208. In this example, the tape guide 108 located downstream of the tape head 112 which function as the sensor, measuring the potential on the tape 104, while the tape guide 108 upstream of the head would function as the effector, applying a cancelling potential to the tape 104.

Figure 3:
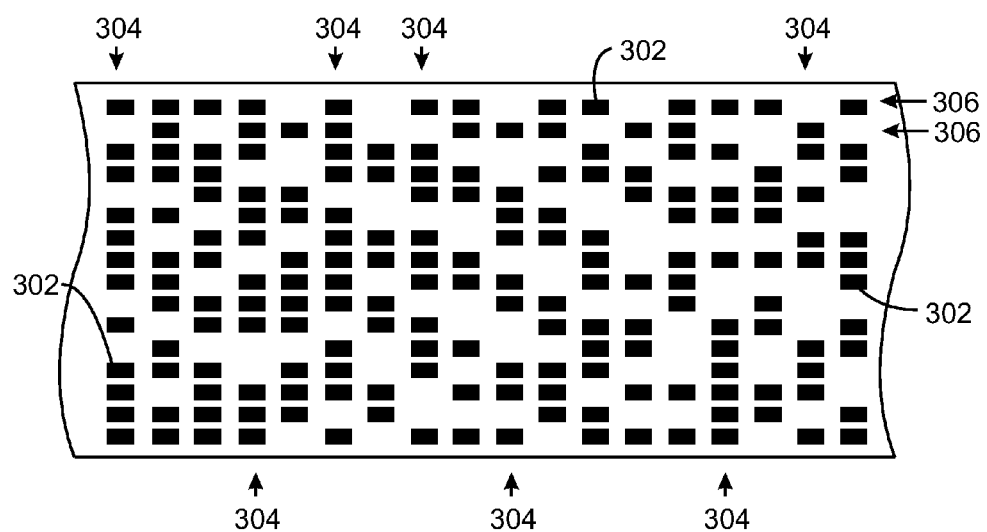
FIG. 3 is a drawing of a tape surface, illustrating the saved bits.

FIG. 3 is a drawing of a tape surface 300, illustrating the saved bits 302. In the example shown, the tape surface stores 16 bits at each data row 304, with each bit corresponding to a read/write element in a read/write head. To simplify the drawing only examples of the bits and rows are labeled. In some examples, 32 read/write elements, or more, can be used to provide even more bits per row. The resulting small size of a read/write element may make these vulnerable to damage. Further, while one or more bits may be used as parity bits 306, even a small amount of intermittent failures to correctly read or write a bit may compromise the system. As greater damage accrues, for example, due to PTR, the system may become progressively unreliable.

Figure 4:
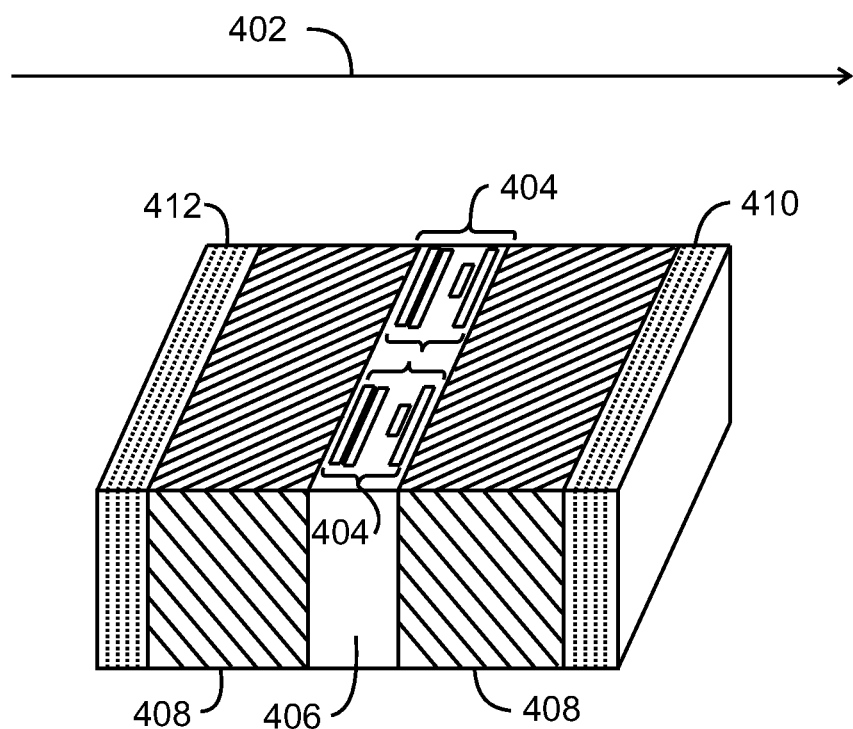
FIG. 4 is a drawing of a read/write head that can be used to detect and mitigate tribocharging in magnetic tape systems.

FIG. 4 is a drawing of a read/write head 400 that can be used to detect and mitigate tribocharging in magnetic tape systems. In this example, the tape motion is indicated by an arrow 402. Two sets of read/write elements 404 are illustrated. The read/write elements 404 are embedded in an insulating region 406, for example, formed from alumina ($Al_2O_3$). On either side of the insulating region 406 are tape bearing surfaces (TBS) 408. The TBS 408 are hard surfaces that facilitate the smooth motion of the tape across the read/write elements 404 and act as reference planes.

In an example, the TBS 408 are made from an alumina titanium carbide composite (AlTiC). Thin film magnetic heads are fabricated by building thin film devices on a ceramic substrate commonly referred to as a "wafer." The base layer of the wafer is often AlTiC, which is alumina-titanium carbide ($Al_2O_3$—TiC) composite. AlTiC is generally electrically conductive and typically includes approximately 30-35% by weight TiC, 24-28 wt. % Ti, 6-7 wt % C, with the remainder $Al_2O_3$. The read/write elements are deposited in an Al2O3 layer on top of the AlTiC wafer. Typically the wafer is diced and another layer of AlTiC is then glued over the read/write elements layer, using, for example, an epoxy. The three-layer construct is then further processed to form the read/write heads. In some examples, addition layers are deposited over the AlTiC wafers to form the structures shown. For example, the structure shown in FIG. 4 may be formed by depositing a layer of conductive material, such as titanium, nickel, aluminum, and the like, over one side of the AlTiC wafer before forming the layer that includes the read/write heads on the other side. In another example the second AlTiC wafer is glued over the read/write elements and a second metal layer is deposited on the opposite of the second AlTiC wafer from the read write elements. Other structures, such as the structure shown in FIG. 5, can be made by changing the order of the deposition of the metal. AlTiC, and read/write elements.

In the example, a sensor region 410, located downstream in the direction of tape motion 402 from the read/write elements 404, measures potential on the magnetic tape. An effector region 412, located or disposed upstream in the direction of tape motion from the read/write elements 404, can be used to apply a potential to the magnetic tape, for example, to obtain a zero potential at the sensor region 410. When the direction of tape motion 402 is reversed, the sensor region 410 and effector region 412 are reversed, so that the sensor region 410 is always downstream of the read/write elements 404.

The sensor region 410 and effector region 412 may be made from any number of materials, such as aluminum, titanium, nickel, AlTiC, or any other appropriate conductive materials. Further, the sensor region 410 and effector region 412 may be electrically coupled to the adjacent AlTiC, or may be separated by an insulating layer.

Figure 5:
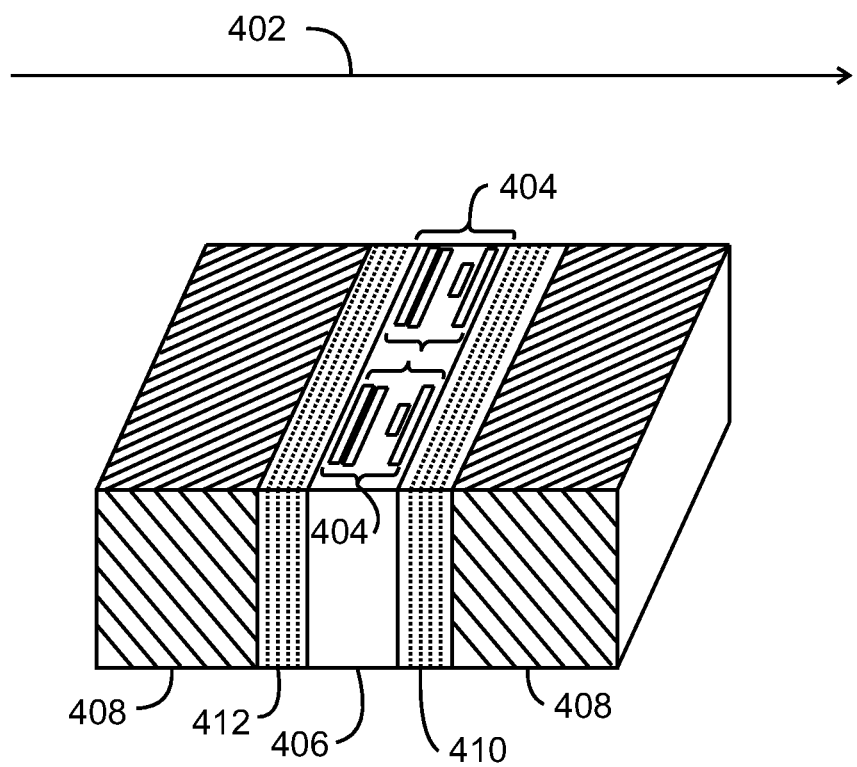
FIG. 5 is a drawing of another read/write head that can be used to detect and mitigate tribocharging in magnetic tape systems.

FIG. 5 is a drawing of another example of a read/write head 500 that can be used to detect and mitigate tribocharging in magnetic tape systems. Like numbered items are as discussed with respect to FIG. 4. The sensor region 410 and effector region 412 do not need to be located outside of the TBS 408, but may be located inside of the TBS 408, adjacent to the insulating region 406 that holds the read/write heads 404.

Figure 6:
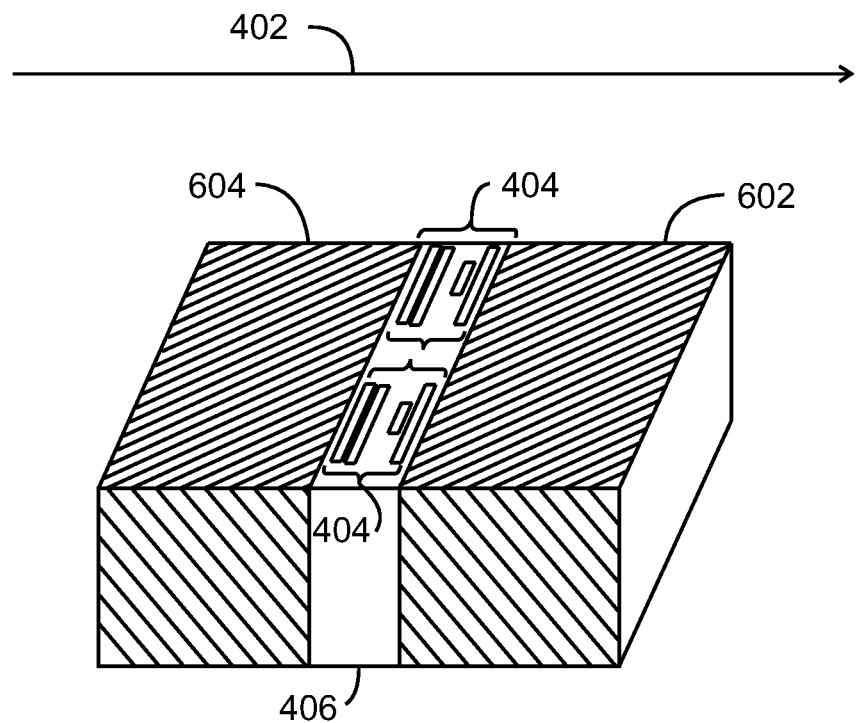
FIG. 6 is a drawing of another read/write head that can be used to detect and mitigate tribocharging in magnetic tape systems.

FIG. 6 is a drawing of another read/write head 600 that can be used to detect and mitigate tribocharging in magnetic tape systems. Like numbered items are as discussed with respect to FIG. 4. Generally, the TBS is a conductive material, such as the AlTiC alloy discussed with respect to FIG. 4. In the example shown in FIG. 6, the TBS is functioning as the sensor region 602 and effector region 604. This can be used to minimize the changes needed to the design of the tape head 600. It also provides a large surface area for each of the regions 602 and 604. As discussed with respect to FIG. 4, the regions 602 and 604 are reversed when the tape motion 402 is reversed.

Figure 7:
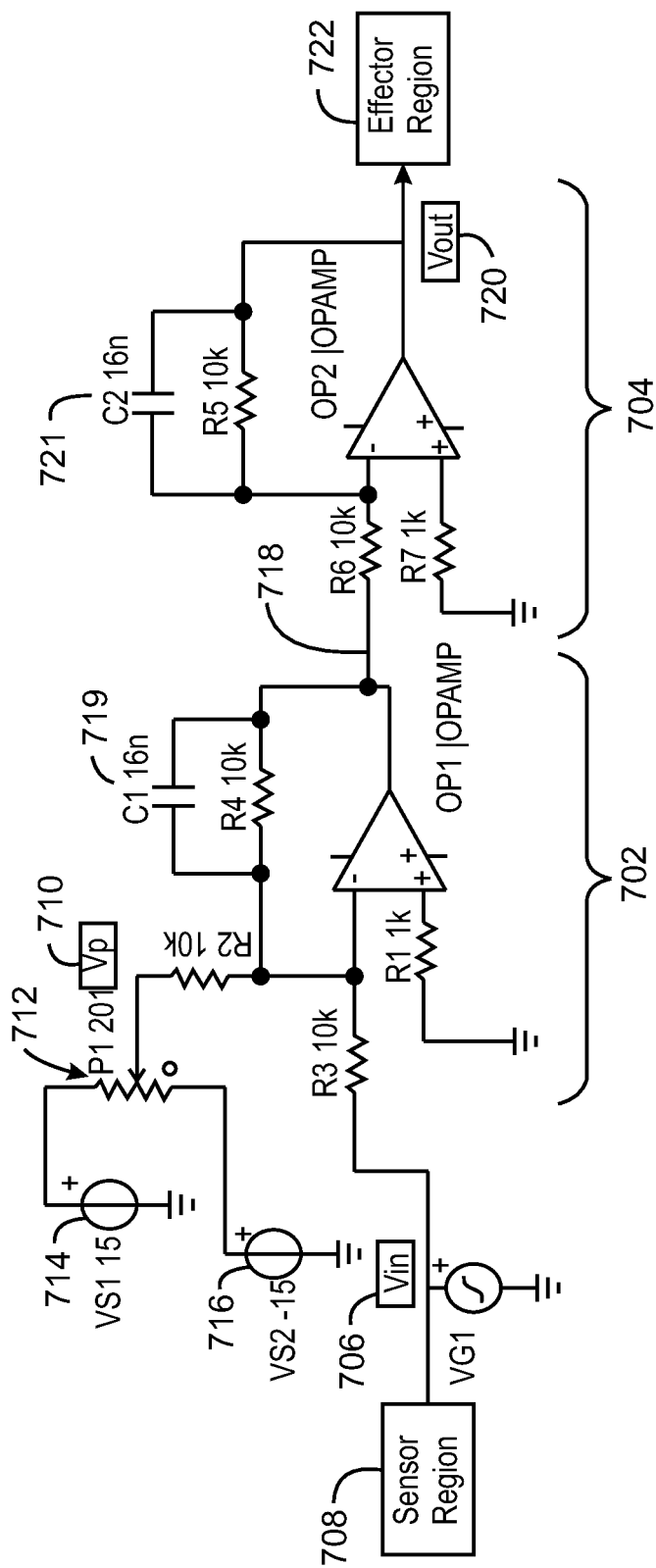
FIG. 7 is an example of an analog circuit that can be used to detect and mitigate tribocharging in magnetic tape systems.

FIG. 7 is an example of an analog circuit 700 that can be used to detect and mitigate tribocharging in magnetic tape systems. The mitigation system described herein is not limited to a digital system, e.g., with a processor making the corrections using a transfer function stored in a memory, as discussed with respect to FIG. 2. Analog circuits may also be used to cancel the tribocharging.

An example of an analog circuit 700 is shown in FIG. 7. The analog circuit 700 uses two operation amplifier (op-amp) stages 702 and 704 to provide the potential, which, for this circuit, is measuring potentials from the magnetic tape and applying a potential to the magnetic tape. The first stage is an offset/filter stage 702 that uses an input voltage (Vin) 706 from a sensor region 708. A reference voltage (Vp) 710 can be generated by placing a potentiometer 712 between a +15 v source 714 and a −15 v source 716. Adjusting the potentiometer 712 will adjust Vp 710, changing the potential difference between Vin 706 and an output voltage (Vout') 718 that is used as the input voltage for the next op-amp stage. Furthermore, the use of a feedback capacitor, C1 719, provides a low frequency bandpass filter, for example, blocking signals with a frequency of greater than about 1 KHz.

The second op-amp stage is an inverter stage 704 that generates the final output voltage (Vout") 720. Vout" 720 is applied to the effector region 722 to cancel the potential caused by movement of the magnetic tape across the read/write head. The inverter stage 704 inverts the signal so that the applied signal is opposite in polarity to the measured signal. As described for the offset stage 702, the use of a feedback capacitor, C2 721, provides a low frequency bandpass filter, for example, blocking signals with a frequency of greater than about 1 KHz. The bandpass filters in the op-amp stages 702 and 704 can prevent the amplification of noise that may affect the mitigation of the tribocharging, or actually interfere with the read/write signals from the read/write elements.

In this example, the analog circuit 700 has a transfer function from the offset stage 702 that is represented by Eqn. 1.

$$\text{Vout}' = \text{Vin}(R4/R3) + \text{Vp}(R4/R2) \qquad \text{Eqn. 1}$$

As noted, Vp can be changed by adjusting the potentiometer. Further, the relationship can also be changed by the selection of the resistors for R2, R3, and R4 in the offset stage 702. The bandpass frequency of the op-amp stages 702 and 704 can be adjusted by appropriate selection of the feedback capacitors, C1 719 and C2 721. The final output voltage Vout" 720 from the inverter stage 704 is related to the output voltage Vout' 718 by the transfer function shown in Eqn. 2.

$$\text{Vout}'' = -\text{Vout}'(R5/R6) \qquad \text{Eqn. 2}$$

It can be noted that the analog circuit 700 shown in FIG. 7 and the values shown therein are merely exemplary. Any number of modifications can be made while remaining within the scope of the present claims. For example, different values may be selected for the resistors and capacitors to change the amplification, the bandpass filtration, and the like. Further, a greater or lesser number of operational amplifier stages may be used. In addition, the use of +15V and −15V for the voltage sources is merely an example. Higher or lower voltages could be used depending on the system variability. The circuit could be modified to use current sources instead of voltage sources.

Figure 8:
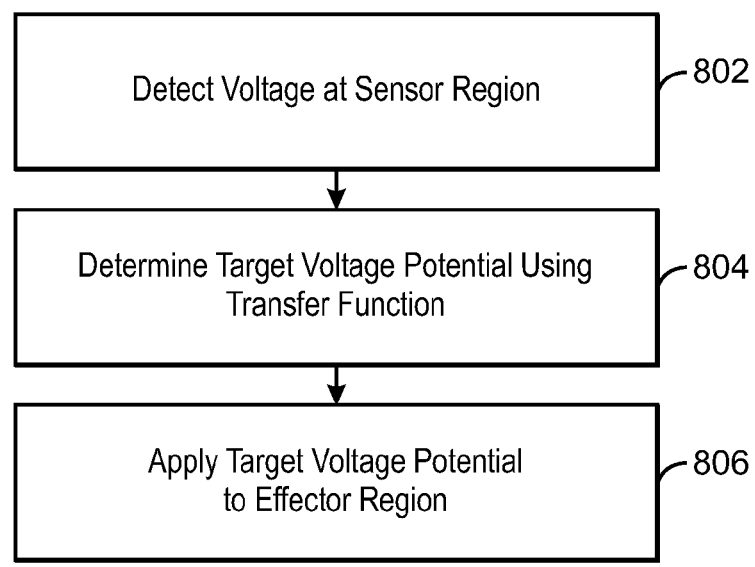
FIG. 8 is a method for mitigating tribocharging in a magnetic tape system.

FIG. 8 is a method 800 for mitigating tribocharging in a magnetic tape system. The method may be performed using a digital technique, for example, as described with respect to FIG. 2, or using an analog circuit, for example, as described with respect to FIG. 7. The method 800 begins at block 802 with the detection of a potential at a sensor region. This may be done using an ADC, as described with respect to FIG. 2, or by coupling the sensor region to the input of an op-amp circuit, as described with respect to FIG. 7. At block 804, a target potential is calculated using a transfer function. This can be performed using instructions executed by a processor, as described with respect to FIG. 2. In another example, the calculation can be performed using the analog circuit shown in FIG. 7. At block 806, the target potential is applied to the effector region to at least partly cancel the tribocharging.

The active cancellation circuit described herein compensates for a number of variables that can cause tribocharging. For example, the use of different tape materials and the physical characteristics thereof, such as conductivity, surface roughness, coefficient of friction, and numerous others. The wear on the tape that can affect properties, such as real area of contact, interfacial lubrication, and chemical modification of interfacial materials. Changes in speed of the tape that can change the amount of tribocharging. The tension on the tape, which can affect the friction of the tape on the read/write head. Wear on the head, and environmental conditions. The techniques do not require applying a biasing potential to the read/write elements, and the compensation is not limited by the constraints of the design of the read/write elements. Further, the much larger area of the tribocharging elements, compared to the read/write elements, can improve the ability to mitigate the tribocharge.

What is claimed is:

1. A system for operating a magnetic read/write head comprising:
    a read/write region to read data from or write data to a magnetic tape;
    an effector region to impose a potential on the magnetic tape;
    a sensor region to sense the potential on the magnetic tape;
    an effector circuit to determine a potential difference between the sensor region and the effector region and adjust the potential applied to the effector region to control the voltage difference using a transfer function; and
    two tape bearing surfaces, wherein a first tape bearing surface is disposed in the direction of tape motion before the read/write region and a second tape bearing surface is disposed in the direction of tape motion after the read/write region, wherein the tape bearing surfaces are configured to be in direct contact with the tape and to facilitate the smooth motion of the tape across the read/write region.

2. The system of claim 1, wherein the sensor region, the effector region, or both comprise titanium, aluminum, or an alloy thereof.

3. The system of claim 1, wherein the sensor region is disposed in the direction of tape motion after the read/write head.

4. The system of claim 1, wherein the effector region is disposed in the direction of tape motion before the read/write head.

5. The system of claim 1, wherein, if the direction of tape motion is reversed, the sensor region and effector region are reversed.

6. The system of claim 1, wherein at least one of the two tape bearing surfaces is comprised of an alumina titanium carbide (AlTiC) composite.

7. The system of claim 1, wherein the effector region is disposed in the direction of tape motion before the first tape bearing surface and the sensor region is disposed in the direction of tape motion after the second tape bearing surface.

8. The system of claim 1, wherein the effector region is disposed in the direction of tape motion after the first tape bearing surface and before the read/write head and the sensor region is disposed in the direction of tape motion after the read/write head and before the second tape bearing surface.

9. The system of claim 1, wherein the first tape bearing surface functions as the effector region and the second tape bearing surface functions as the sensor region.

10. The system of claim 1, further comprising at least 16 read/write regions.

11. The system of claim 1, wherein a tape bearing surface is disposed between the read/write region and the sensor region, and another tape bearing surface is disposed between the read/write region and the effector region.

12. A method for operating magnetic tape heads, the method comprising:
    detecting a potential at a sensor region;
    determining a target potential using a transfer function; and
    applying the target potential to an effector region, wherein the effector region and the sensor region are disposed in separate structures in the tape path before and after the tape head.

13. The method of claim 12, further comprising setting the target potential to substantially cancel the voltage determined at the sensor region.

14. The method of claim 12, further comprising determining the target potential in a balanced operational amplifier circuit.

15. The method of claim 12, further comprising determining the target potential in a microprocessor, wherein the transfer function is encoded as instruction in a machine readable medium.

16. The method of claim 15, wherein the potential on the sensor is measured using an analog-to-digital convertor, and the target potential is applied to the effector using a digital-to-analog convertor.

17. A tape drive comprising:
    a magnetic read/write tape head comprising:
        a read/write region to read data from or write data to a magnetic tape;
        an effector region to impose a potential on the magnetic tape;
        a sensor region to sense a potential on the magnetic tape; and
        an effector circuit to determine a potential difference between the sensor region and the effector region and adjust the potential applied to the effector region to control the potential difference using a transfer function; and
        two tape bearing surfaces, wherein a first tape bearing surface is disposed in the direction of tape motion before the read/write region and a second tape bearing surface is disposed in the direction of tape motion after the read/write region, wherein the tape bearing surfaces are configured to be in direct contact with the tape and to facilitate the smooth motion of the tape across the read/write region; and
    a tape transport mechanism comprising a supply reel, a take-up reel, and a drive mechanism.

18. The tape drive of claim 17, further comprising a microprocessor control system comprising the effector circuit.

19. The tape drive of claim 17, further comprising:
    a tape cartridge, wherein the tape cartridge comprises the supply reel; and
    a tape drive body, wherein the tape drive body comprises the take-up reel.

20. The system of claim 17, wherein the tape bearing surfaces are configured to function as the sensor region and the effector region.

\* \* \* \* \*